2,971,291
PRODUCTION OF FAST GROWING FOREST TREES BY VEGETATIVE PROPAGATION

Siegfried Herrmann, 29 Entenbusch, Hannoversch Munden, Germany

No Drawing. Filed June 6, 1957, Ser. No. 663,872

Claims priority, application Germany June 11, 1956

3 Claims. (Cl. 47—58)

The invention relates to the production of plants having continuous optimum growth properties.

It is known to propagate many species of forest trees vegetatively and asexually whereby synthetic growth substances may be used. In forest tree nurseries two methods are used for this purpose: Grafting, also called heterovegetative propagation, and cuttings, also called autovegetative propagation.

In the use of grafts and cuttings from forest trees it has been observed that such grafts and cuttings which are generally taken from the very old plus trees have, after several years, very slow growth. Such grafts and cuttings represent old age forms because the mother trees grown from seeds were, at the time when the vegetative descendants were taken, in a phase of slow old age growth.

The term "plus trees" is used in German forestry to designate individual trees which are distinguished from the surrounding trees by outstanding properties (good growth, straight stem, few branches etc., e.g., for spruce) and are, for this reason, used for propagation.

I have found that it is possible to fix the youth development phase in a vegetative descendant and to transmit said fixed youth growth from vegetative generation to vegetative generation. This applies to vegetative descendants which are derived from the shoots of seed-produced mother plants. Suckers behave differently.

We have to distinguish two growth tendencies, which will be called the vegetative and the generative tendency; the "generative tendency" may also be called "genetic constitution" and the "vegetative tendency" may be called "reaction substrate." The term "reaction substrate" of the cell is used to designate the so-called third component, which is present in addition to the genetic constitution and to the ecological conditions. Said "vegetative tendency" is quasi controlled by the generative tendency. A vegetative descendant generated from a shoot separated from a seed-grown mother tree continues to grow independently with the same vegetative intensity, which obtained at the time of separation from the mother tree. Such vegetatively propagated descendant does not follow the predetermined growth curve of the seed-produced mother tree but it is physiologically subjected only to the influence of the respective station and of its environment. It seems that the reaction substrate of the cell acted upon by the genes permits, under the physiological conditions described a certain effect, which remains unchanged on separation from the original cell association.

In accordance with this discovery, my novel method consists in taking vegetative descendants substantially from the youngest main shoot of a shoot or from branches of the lowest order of seed-produced mother plants at the time of their growth culmination. A suitable index for said growth culmination period is the rate of vertical growth, whereby other measurable or objective criteria relating to the growth intensity of a plant may be additionally considered; such criteria are, for instance, diameter, strength, bark, assimilating surface, rate of assimilation, and the like. Trees which have been vegetatively propagated in this manner, present a maximum rate of total growth which continues with unchanged intensity to the physiological limit; said total growth is increased by the fact that such trees apparently bear fruit only to a small degree because the regenerative phase in the life of a tree frequently is reached only subsequently to the growth culmination. Such cuttings obtained from seed-produced mother plants at the time of their growth culmination, preferably from the youngest main shoot, which subsequently may have been artificially rooted, will be called hereafter "Culmination growth cuttings"; in such plants, maximum rate of growth has been fixed as inherent property.

Such "culmination growth cuttings" may be readily obtained from any tree species and further propagated in any desired quantity in nurseries. This applies also to poplars and willows, which at present are already vegetatively propagated and the wood production of which can be increased by the novel method.

Growth increases produced by other methods, for instance by breeding are surpassed by the use of "culmination growth cuttings" because the novel method can be applied in any case, also to high-bred individual plants. The method can be applied to all forest trees capable of vegetative propagation, and generally to all plants which can be vegetatively propagated, also to agricultural plants.

The difficulties experienced with the artificial rooting particularly of coniferous cuttings have been due primarily to the fact that all such attempts were made with cuttings taken from the crown region of the old or very old so-called plus trees. The rooting and grafting power of such cuttings is necessarily weak because of their low vitality.

From the forestry point of view the main advantage obtained by the use of culmination growth cuttings is the possibility to plant all kinds of trees in the soil suitable therefor. This, in turn, permits a reforestation with mixed forests, which offer an economically stable high timber production.

Shade-loving trees, such as spruce, fir, beech, are generally characterized by slow growth in their first development stages; conversely, trees requiring much light, such as larch, have a slow rate of growth when old. Said periods of slow growth are eliminated by the use of cuttings obtained according to the invention. The curve of total growth in such plants is, therefore, much more extended and uniform compared with the growth curves of plants and trees obtained from seeds or from cuttings and grafts taken from mother plants, which are not in the stage of highest growth development.

The novel method, which allows of increased wood production without increasing the planted area will be illustrated by the following examples.

Example 1

On the same station, a seed-produced Norway spruce (*Picea abies*) was compared with cuttings taken from 10–20-year-old and from about 130-year-old trees.

Each year, the vertical growth, and the diameter and sectional cross-area at a height of 5 cm. above ground level, were measured. The following table gives the total growth figures, as an average of 16 trees, after 7 years' growth.

|  | Total height in cm. | Diameter | Cross-section |
|---|---|---|---|
|  |  | 5 cm. above ground level | |
|  |  | *Mm.* | *Sq. cm.* |
| Seed produced | 53 | | |
| Cuttings from 10–20-year-old trees | 130 | 31.4 | 8.1 |
| Cuttings from 130-year-old tree | 45 | 12.3 | 1.26 |

Similar results were obtained, for instance, on comparison of 9-year-old seedlings from *Ulmus montana* with the corresponding cuttings from 20-year-old mother trees.

Example 2

The annual growth rate of 5-year-old graftings of *Picea abies* was measured, disregarding the growth of the stock. In the one case, the graftings were taken from a 9-year-old mother tree; in the other case from a tree which was 120 years old.

The growth of the vegetative descendants (measured after 5 years from the graft basis to the top bud) was 106–181 cm. for the graftings from the 9-year-old tree, and only 41–66 cm. for those of the 120-year-old mother tree.

Similar differences were shown by graftings of Douglas fir (*Pseudotsuga taxifolia* on *Pseudotsuga taxifolia*).

I claim:

1. A method for the production of fast growing forest trees by vegetative propagation comprising taking cuttings from seed-produced mother trees at the time of their growth culmination phase and planting said cuttings.

2. A method for the production of fast growing forest trees by vegetative propagation comprising planting a cutting taken from a seed-produced mother tree at the time of a high rate of growth of said mother tree to produce a fast growing first generation descendant, and producing subsequent generations of similar growth properties by planting cuttings taken from a preceding generation, thereby transmitting the growth properties of the original seed-produced mother tree at the time of its growth culmination phase to each subsequent vegetatively propagated generation of descendants.

3. A method for the production of fast growing forest trees by vegetative propagation comprising planting a cutting taken from a tree originated from a cutting taken from a seed-produced mother tree at the time of its growth culmination phase.

References Cited in the file of this patent

Gardner: "The Relationship Between Tree Age and the Rooting of Cuttings," published February 1930 in Proceedings of the American Society for Horticultural Science 1929, vol. 26, pages 101 through 104.

O'Rourke: "The Effect of Juvenility on Plant Propagation," published before August 25, 1955, in Proceedings, First Plant Propagators Society Annual Meeting, November 1951, pages 33 through 37.

"Plant Propagation" (Mahlstede); published 1957 by John Wiley & Sons (N.Y.), and by Chapman & Hall (London), pages 196, 197, 224, 225, 228, and introductory pages (IV) through (VII) are relied on.